United States Patent [19]
Müller

[11] Patent Number: 5,509,016
[45] Date of Patent: Apr. 16, 1996

[54] PROCEDURE AND ARRANGEMENT FOR A RADIO COMMUNICATIONS SYSTEM

[75] Inventor: Walter Müller, Kista, Sweden

[73] Assignee: Telefonaktiebolaget LM Ericsson, Stockholm, Sweden

[21] Appl. No.: 362,786

[22] Filed: Dec. 23, 1994

[30] Foreign Application Priority Data

Dec. 29, 1993 [SE] Sweden ................. 93043255

[51] Int. Cl.⁶ ..................................... H04J 3/16
[52] U.S. Cl. ................. 370/95.3; 370/106; 375/366; 455/38.1
[58] Field of Search .................. 370/95.1, 95.3, 370/100.1, 110.1, 95.2, 50, 58.1, 58.2, 68, 94.1, 60, 77, 85.7, 99, 102, 103, 104.1, 105, 105.1, 105.2, 105.3, 105.4, 106, 108; 455/33.1–33.4, 51.1, 13.2, 38.1; 375/116, 1, 200, 203, 205, 206, 355, 356, 361, 362, 365, 366

[56] References Cited

U.S. PATENT DOCUMENTS

| | | | |
|---|---|---|---|
| 3,742,498 | 6/1973 | Dunn | 342/88 |
| 4,694,473 | 9/1987 | Etoh | 375/116 |
| 4,977,580 | 12/1990 | McNicol | 370/95.3 |
| 5,125,102 | 6/1992 | Childress et al. | 455/9 |
| 5,229,996 | 7/1993 | Bäckström et al. | 370/100.1 |
| 5,235,615 | 8/1993 | Omura | 375/1 |
| 5,355,515 | 10/1994 | Sicher | 455/33.2 |

FOREIGN PATENT DOCUMENTS 1-190035  7/1989  Japan.
32-6739   9/1991  Japan.

OTHER PUBLICATIONS

RCR STD-27B, Chapter 4, Communications Control System, pp. 39–120.

*Primary Examiner*—Douglas W. Olms
*Assistant Examiner*—Dang Ton
*Attorney, Agent, or Firm*—Burns, Doane, Swecker & Mathis

[57] ABSTRACT

For a radio communications system with time-divided frequencies, the synchronization between a base station and a mobile station is shifted as the mobile moves. The base station transmits symbol sequences with synchronization words to the mobile, which through this obtains a reference point in time. The mobile transmits to the base station symbol sequences with synchronization words, which in the mobile may be displaced in time relative to the reference point in time. The base station generates a reception point in time for the symbol sequences from the mobile by correlation and filtering. The reception point in time is compared with the reference point in time and upon a mutual deviation, a time deviation is generated for the base station. This time deviation is added to a previous time shift in the mobile. A new value for the time shift in the mobile is sent with an adjustment order and the mobile adjusts its transmission point in time relative to the reference point in time by means of the adjustment order. In order to increase the probability that the mobile detects the adjustment order, this order is repeated a number of times. If the reception point in time after this remains unchanged, a resynchronization is ordered, or as an alternative, a release of the connection. Disturbances to the radio connection due to deficient synchronization or frequently recurring resynchronization are reduced.

14 Claims, 8 Drawing Sheets

PROCEDURE AND ARRANGEMENT FOR A RADIO COMMUNICATIONS SYSTEM

BACKGROUND

The present invention relates to a radio communications system using time multiplexed frequencies, in which system transmitted symbol sequences in time slots of the system have a transmission point in time which is adjusted at a transmitter. Through this adjustment of the time, the symbol sequences are received by a receiver at a predetermined point in time in the time slot.

For time-divided multiplex radio communication systems it is of great importance that transmitters and receivers are well synchronized. Different transmitters, transmitting to a common receiver utilizing a common carrier frequency, have to transmit their symbol sequences in a well-defined order in consecutive time slots and at predetermined times in the time slots. If the synchronization is deficient, the symbol sequences from the different transmitters will overlap and interfere with each other at the receiver. This problem is particularly apparent for land mobile radio systems. As the mobile radio stations of the system move in relation to a stationary or at least quasi-stationary base station, time shifts of the symbol sequences arriving at the base station appear. Even if a specific mobile and the base station are well synchronized at the beginning of a connection, the time shifts may cause loss of synchronization. If, for instance, the mobile moves away from the base station, the symbol sequences will be delayed and will impose on the next time slot, which belongs to a different mobile.

The above stated problem with deficient synchronization is well known, and various methods have been developed in order to retain the synchronization between two radio stations. Taken as an example, for the Japanese mobile telephone system a standard called RCR STD-27B has been elaborated, describing a method of successively adjusting the point in time of transmission in a time slot belonging to the mobile. The base station measures during the course of a call the point in time when the symbol sequences from the mobile arrive at the base station and compares this point in time with a predetermined point in time in the current time slot. If a delay of a full symbol time is detected, the base station will send an adjustment message ordering the mobile to advance its time of transmission by one symbol time in relation to the reference time of the mobile. The adjustment order is issued only once and no acknowledgment is sent by the mobile. The measurement of the time position continues and the base station detects once more a delay of a full symbol time. The base station issues a renewed adjustment order to the mobile to advance its time of transmission, this time by two symbol times in relation to the reference time, upon which the mobile performs the order. If, however, the mobile did not detect the first adjustment order and no further time shift has occurred, the base station will nevertheless measure a delay of one symbol time at the second measurement. According to the standard, the base station is allowed, on this occasion as well, to issue another adjustment order to the mobile to advance its time of transmission by two symbol times in relation to its reference time, as it is presupposed that the mobile has really received and performed the first order. If the mobile detects the second order, this order will anyhow be neglected since the standard also prescribes that deviations of only one single symbol time from the current time position may be performed after the adjustment order. The procedure continues by the base station measuring the delay to be once more one symbol time, ordering the mobile to adjust by three symbol times in relation to its reference. This way, the synchronization may be lost and the mobile may during a call utilize an erroneous point in time of transmission in its time slot and disturb other mobiles using the same carrier frequency. To avoid this, the standard allows for a total resynchronization. If the mobile causes large disturbances, one alternative is to disrupt the call. It has been mentioned in the description above that the symbol sequences are delayed and that the mobile is ordered to advance its time of transmission. It may of course also happen that the symbol sequences from the mobile have already been shifted in time in relation to the reference time by a number of symbol times. The mobile may then move so that the symbol sequences arrive too early at the base station. The base station will then order the mobile to reduce its advancement of the time of transmission.

To measure the point in time of transmission of the mobile at the base station has proved to be relatively difficult, due to the fact that the measurement is disturbed by noise. The standardized procedure, to order the mobile to shift its time of transmission by only one symbol time has the advantage that major shifts back and forth in time of the time of transmission are avoided. Such shifts may occur when a mobile mistakes a noise signal for an adjustment order, ordering the mobile to shift its time of transmission by several symbol times. The procedure has, however, the disadvantage that the base station may start issuing orders to the mobile to shift the time of transmission by an increasing number of symbol times, as described above, without these orders being carried out.

The problem of synchronization is treated in the U.S. Pat. No. 4,694,473, which describes synchronization in a mobile radio system for data communication. All transmitted symbol sequences are provided with three different synchronization words. By means of these, the starting point in time for the symbol sequence can be calculated, even if one of these synchronization words is lost due to difficult transmission conditions such as fading.

Synchronization, when setting up a connection, is shown in the U.S. Pat. No. 5,125,102. On a control channel, used for setting up a connection, a synchronization word is repeated three times, and the receiver repeats an acknowledgment word three times during the continued connection procedure.

The U.S. Pat. No. 5,235,615 shows a way to establish synchronous CDMA communication between a base station and a plurality of mobiles. The base station measures the time delay between the different mobiles and the base station itself, by periodically emitting an access signal, measuring the time elapsed when an answer from a specific mobile is received. The delay thus measured is then transferred to the mobile, which performs a synchronization by adjusting its transmission in relation to the periodically issued access signal.

The U.S. Pat. No. 5,229,996 shows a method of achieving synchronization in a TDMA system by adjusting the time of transmission in the time slots from the mobiles of the system. The time adjustment is made by the base station issuing an adjustment command to the mobile. To prevent the detection of a false signal from the mobile, two time windows in the base station are defined, one that corresponds to the time position of the signal before the adjustment order and one that corresponds to the time position where the signal is supposed to be located after the adjustment order.

SUMMARY

The purpose of the present invention is to ensure good synchronization of a set-up connection between radio stations in a radio communications system with time division multiplexed carrier frequencies. The invention contributes to keeping the interference at a low level both for the set-up connection and for connections on adjacent time slots using the same carrier frequency.

A method and an arrangement are described, according to which deviations as to synchronization between two radio stations are measured during on-going traffic by one of the radio stations, which orders the other radio station to adjust its point in time of transmission. The adjustment order is repeated in order to increase the probability of detecting the order. The commanding station continues measuring synchronization deviations after issuing the last adjustment order. If the adjustment order has not been performed, according to one alternative, a total resynchronization is ordered, according to another alternative the connection is be disrupted.

The synchronization between two radio stations in a radio communications system with time-divided carrier frequencies may be lost through time shifts which arise from e.g. the fact that one station is fixed while the other is mobile. The mobile station transmits symbol sequences with synchronization words and the fixed station measures by means of the synchronization words a point in time in a time slot when the symbol sequences from the mobile station are received. The fixed station compares the point in time for the reception with a predetermined reference time. In case of a deviation between these points in time, the fixed station emits an adjustment order to the mobile station to change its time of transmission. A synchronization word is sent together with the adjustment order, stating the reference time. The adjustment order specifies the time of transmission in the mobile to be advanced by a specific number of symbol times in relation to the reference time. The expression "symbol time"denotes the time it takes to transmit one symbol. It should be noted that it is relatively difficult to measure the time of reception in the fixed station as the measurement is often disturbed by heavy noise, and a mean value of the time of reception is therefore generated. Another substantial problem is that the mobile station may have difficulties in detecting the adjustment order. This difficulty may be due to the mobile station's suffering from severe receiving conditions, e.g. fading. According to the invention, the adjustment order is sent two times, at least, and preferably even more than this, each time in a different time slot. Through this, the probability that the mobile will really detect the adjustment order is increased. It may occur, in this context, that the mobile actually detects the first adjustment order and adjusts to the requested time position. The additional adjustment orders received by the mobile will then only imply orders to adjust the time of transmission to a specific time position within the time slot, already held by the mobile. These additional adjustment orders do not cause any further shifts of the time of transmission, even if the mobile detects the orders. It may also occur that the mobile does not detect any of the adjustment orders despite the repetitions. The fixed station will continue to measure the time of reception of the signal sequence from the mobile station. If no changes as to the point in time are detected after the last adjustment order, the fixed station may request a resynchronization. This can be performed relatively directly after the last adjustment order. The decision to resynchronize only requires the recognition of whether the time of reception has changed or not, and an absolute position for the time of reception at the fixed station does not have to be measured. The radio transmission may suffer from severe disturbance during the resynchronization. For such a disturbed connection, one alternative is not to use the adjustment order generated at the resynchronization, but instead use the old adjustment order, which was never performed. This previous adjustment order is in most cases more reliable than the new order generated during severely disturbed radio transmission. It is also possible to store a number of old adjustment orders, using them in turn, to modify the time of transmission for the mobile station, until the correct time of reception at the fixed station is achieved. One alternative to resynchronization is to disrupt the connection if it is being severely disturbed or if it is severely disturbing adjacent time slots.

The synchronization, according to the present invention, contributes to keeping the disturbances of the radio traffic at a low level. If the time of reception of the symbol sequences from the mobile is shifted by several symbol times at the fixed station, the proprietary connection as well as any connection with a adjacent time slot on the same carrier frequency will be disturbed. According to the invention, the mobile station will be ordered a repetitive number of times to adjust its point in time of transmission, as described above. This will substantially increase the probability of detecting the adjustment order, so that the time of reception at the fixed station will deviate with less than one symbol time from the predetermined reference time.

By increasing the probability that successive time adjustments will eventually be performed at the transmitting station, in accordance with the invention, the necessity of a resynchronization will diminish. This will lessen the disturbances to the connection, as the resynchronizations themselves cause certain disturbances to the connection. The risk of having to disrupt the connection is also diminished.

BRIEF DESCRIPTION OF THE DRAWINGS

The invention will be further described below, in conjunction with the drawings out of which

DETAILED DESCRIPTION

Figure 1:
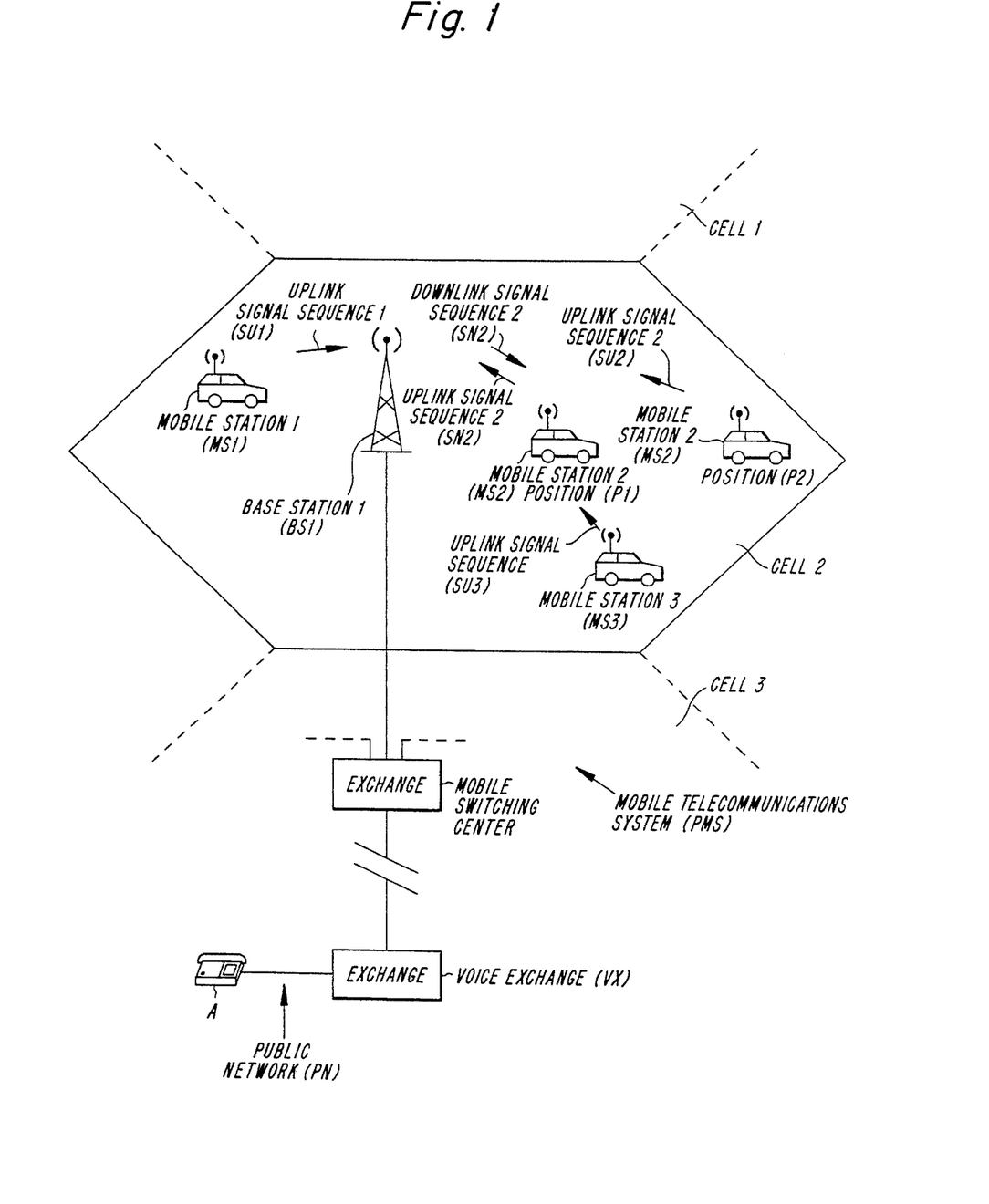
FIG. 1 shows a cell in perspective view, with a base station and mobile stations in a mobile telephone system.

FIG. 1 shows a cell C1 in a mobile telecommunications system PMS which contains a first radio station, being a base station BS1. This is connected to an exchange MSC in the mobile telecommunications system. The exchange MSC is connected to a number of base stations, not shown in the figure, but indicated by dashed connectors. The base station has several transmitters/receivers, one for every carrier frequency, which are controlled by a control processor which also communicates with the exchange MSC. The latter is connected to an exchange VX in a wire-bound telecommunications system, to which a wire-bound subscriber A is connected. The mobile telecommunications system PMS covers a number of cells geographically, out of which the cells C2 and C3 are indicated by dashed lines. The base station BS1 communicates with at least one second radio station. According to the present embodiment, three mobiles MS1, MS2 and MS3 are located in the cell C1 being connected to the mobile telecommunications system via the base station BS. The three mobiles are connected to the base station BS1 through individual channels and in order to illustrate the invention, it is assumed that all three channels reside on the same pair of carrier frequencies, each having a separate time slot on these carrier frequencies. The three channels are further depicted in FIG. 2A. The mobile MS1 uses a time slot TS1 with a symbol sequence SU1 on the uplink and a symbol sequence SN1 on the downlink, the mobile MS2 has in the same manner a time slot TS2 with uplink and downlink symbol sequences SU2 and SN2 respectively, whereas the mobile MS3 has a time slot TS3 with uplink SU3 and downlink SN3. The uplink is generally denoted by UL, the downlink with NL and the time by T. Together, the three time slots make up a frame FR occupying a period of 20 ms. Within the time slots TS1, TS2 and TS3, predetermined reference points in time are marked, N1, N2 and N3 respectively. It is desired that the respective signal sequences on the uplink UL should originate at these reference times when received by the base station BS1. This relationship is shown in the left half of FIG. 2A and signifies that the three mobiles MS1, MS2 and MS3 are well synchronized and interfere with each other minimally. In the right half of FIG. 2A, a situation is shown where a time deviation of $\Delta N(B)$ of the symbol sequence SU2 in the time slot TS2 has occurred. This time deviation means that the mobile MS2 no longer is well synchronized, but imposes on the time slot TS3 and that the symbol sequences SU2 and SU3 disturb each other on their common carrier frequency. How this situation arises will be described in more detail, below. It should be noted that the time slots on the uplink UL and on the downlink NL are time shifted relative to each other, as transmission and reception can not be performed simultaneously in the mobile stations. The uplink UL and the downlink NL have therefore been separated in FIG. 2A each having a separate time axis T. This time shift between the downlink and the uplink equals 259 symbol times, according to the standard RCR STD-27B. The time slots are, however, displayed in such a way that the time slots on the uplink and on the downlink belonging to the same connection are located straight above each other.

Figure 2A:
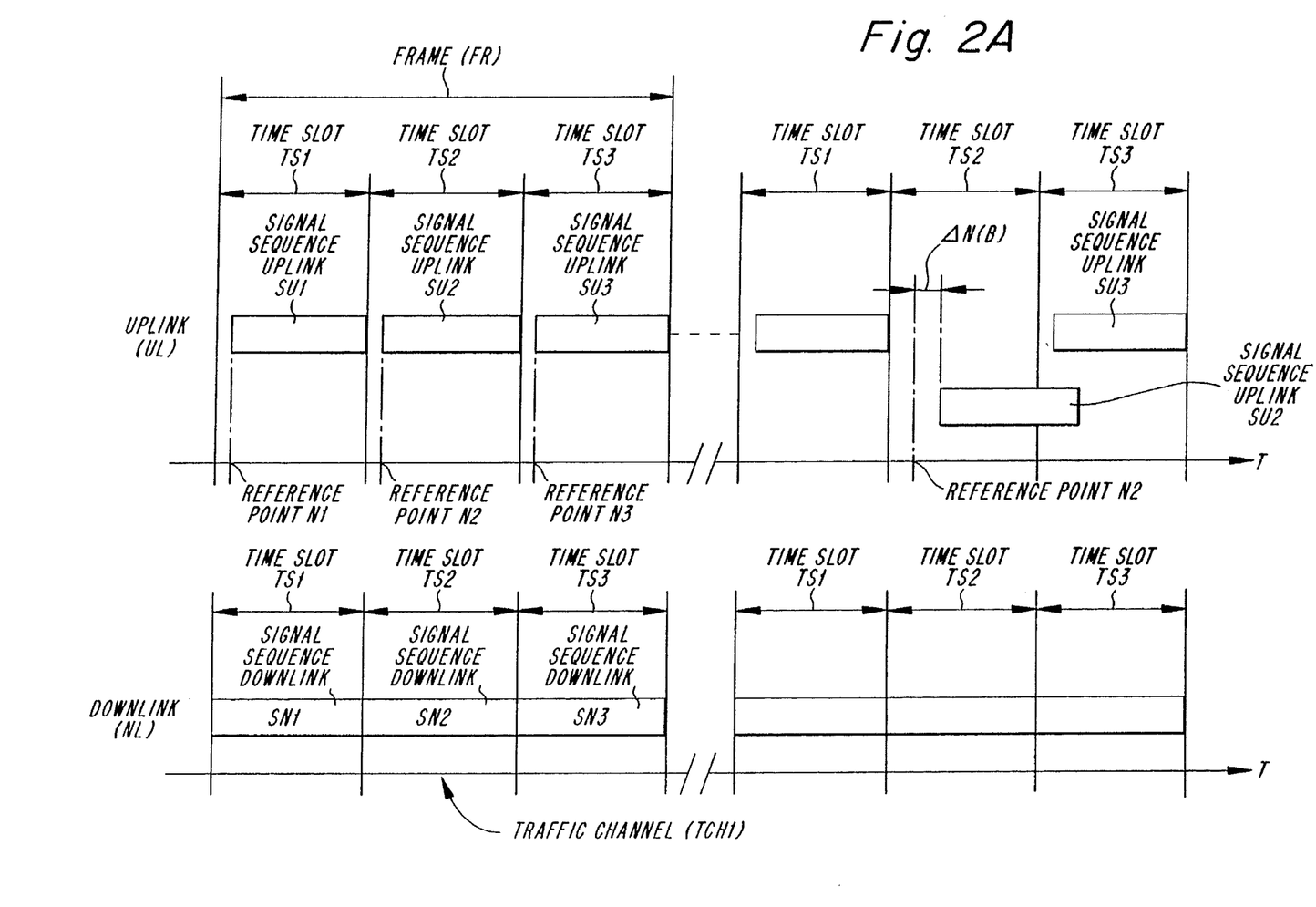
FIG. 2A shows a time diagram, with time slots at the base station in the mobile telephone system.
Figure 2B:
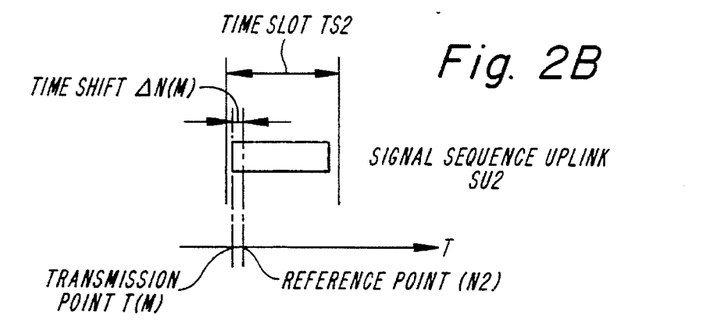
FIG. 2B shows a shows a time diagram, with a time slot at one of the mobile stations.
Figure 2C:
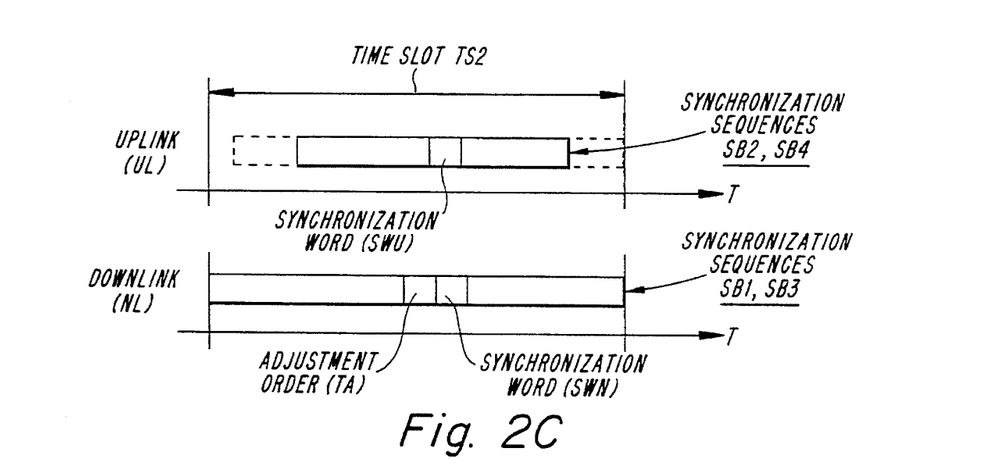
FIG. 2C shows a time diagram with symbol sequences, which are used for synchronizing the base station with the mobile.
Figure 3:
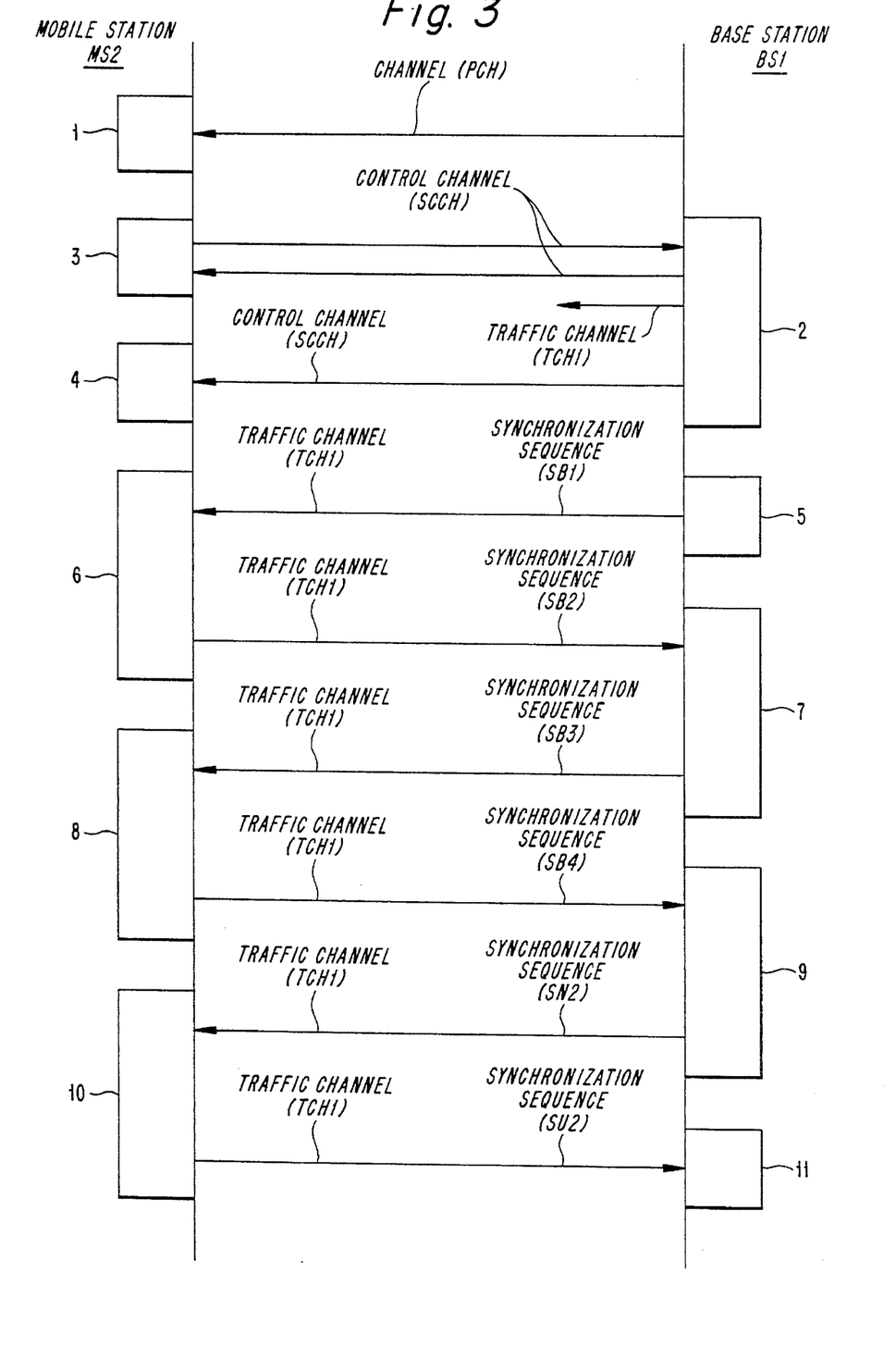
FIG. 3 shows a signalling diagram for signalling between the base station and one of the mobile stations.

In conjunction with FIG. 3, it will be outlined how the base station BS1 and the mobile stations MS1, MS2 and MS3, will obtain their respective reference points in time N1, N2 and N3. FIG. 3 shows a signalling diagram for synchronization and allocation of traffic channels to the mobiles in the mobile telecommunications system PMS, according to the above related standard RCR STD-27B for the Japanese mobile telecommunications system. The mobile, according to the example mobile MS2 listens to the base station BS1 on a channel PCH, as shown in block 1. The mobile is then called by the subscriber A, upon which an access procedure is performed on a control channel SCCH. The procedure includes the exchange of several messages between the base station and the mobile, according to blocks 2 and 3, commenced by the base station BS1 utilizing the channel PCH to obtain a response from the mobile MS2 on the control channel SCCH. The access procedure is terminated by the base station assigning a traffic channel TCH1, which is a dedicated time slot on a dedicated frequency. The base station immediately starts sending a synchronization sequence SB1 on the traffic channel TCH1. This synchronization sequence is shown in FIG. 2C. Simultaneously, on the control channel SCCH an order is issued to the mobile MS2 to switch to the assigned traffic channel TCH1. The mobile detects this order according to block 4 and selects the traffic channel TCH1. According to block 5, the base station will continue to send the first synchronization sequence SB1, containing the synchronization word SWN. The mobile detects, according to block 6, the synchronization sequence and by means of the synchronization word SWN, the mobile will generate its reference point in time N2. The mobile transmits, according to block 6, a second synchronization sequence SB2 to the base station on the traffic channel TCH1. The base station measures the time position for the received sequence SB2 according to block 7, this being made by means of a synchronization word SWU in FIG. 2C. The measured time position may deviate by a number of symbol times from the desired time position, shown in FIG. 2C. Through a third synchronization sequence SB3 the base station gives an adjustment order TA to the mobile MS2 to shift its time of transmission T(M) by an integer number of symbol times. This shifted time of transmission will be used only when the mobile starts transmitting to the subscriber A. The mobile transmits, according to block 8, a symbol sequence SB4 with an acknowledgment indicating what time shift it will adjust to. This shifted time of transmission T(M) for the mobile MS2 is given in FIG. 2B, which shows the time slot TS2 having the symbol sequence SU2 advanced $\Delta N(M)=1$ symbol time, in relation to the reference point in time N2. If the acknowledgment agrees with the order from the base station BS1, which is established by the base station according to block 9, the mobile MS2 is synchronized. It will then transmit symbol sequences SU2 which are correctly positioned in the time slot TS2, when arriving at the base station BS1, as shown in the left part of FIG. 2A. Messages from the subscriber A are now transmitted, as described in block 9, to the mobile on the downlink NL on the set traffic channel TCH1 in the time slot TS2. According to block 10, the mobile receives messages from the subscriber A on the downlink NL on the traffic channel TCH1 and on the same channel on the uplink UL the mobile transmits messages to the subscriber A in the time slot TS2. These messages are received by the base station BS1, according to block 11.

The above mentioned symbol sequences SB1 and SB3 on the downlink NL and SB2 and SB4 on the uplink UL are shown in FIG. 2C. On either side of the symbol sequences SB2 and SB4 there are empty spaces marked with dashed lines. These symbol sequences are thus considerably shorter than the time slot TS2, so that the risk of MS2 disturbing the adjacent time slots before it is completely synchronized is minimal. On the uplink and on the downlink the symbol sequences have the synchronization words SWU and SWN, respectively. The synchronization word SWU is used for establishing the time position for the sequences SB2 and SB4, as the base station BS1 correlates the received sequence with the predefined sequence SWU, which is also known to BS1. The synchronization word SWN is, as mentioned, used by the mobile MS2 to establish the reference point in time N2 by the mobile correlating the received signal with the predefined sequence SWN, which is also known to by the mobile MS2. For a more detailed description of the synchronization words, the reader may refer to the aforementioned standard RCR STD-27B, section 4.1.4.3.3.

As been referred to above, the left part of FIG. 2A shows a situation when the symbol sequences from the mobiles MS1, MS2 and MS3 arrive at the base BS1 at the desired reference points in time N1, N2 and N3. This situation is also shown schematically in FIG. 1 for the mobiles MS1 and MS3 and for the mobile MS2 when it is located in a position P1 in the cell C1. The three mobiles are well synchronized, making the symbol sequences SU1, SU2 and SU3 arrive at the base station BS1 in the right order. It is presumed that a call is on-going between the subscriber A and the mobile MS2, so that the conveyed symbol sequences SN2 and SU2 are transmitted on the traffic channel TCH1. The mobiles MS1 and MS3 are essentially stationary, while the mobile MS2 is moving away from the base station BS2 to a position P2. This implies that the symbol sequences SU2 from the mobile MS2 will be delayed before they reach the base station BS1. If the mobile MS2 moves away far enough from the base station, the situation described in the right half of FIG. 2A may arise, namely that the symbol sequence SU2 in the time slot TS2 will overlap and thus disturb the symbol sequence SU3 in the time slot TS3. According to the mentioned Japanese standard, this may be prevented by the base station BS1 continuously measuring the time position of the received symbol sequences SU2 and issuing adjustment orders to the mobile MS2 in case the reception point in time for a symbol sequence has been shifted by a symbol time. According to the invention, the adjustment order is given on at least two occasions, to ensure better that the mobile will have detected the order, and according to the present embodiment the adjustment order is issued four times. How the ordering of the time adjustment is made, according to the present invention, will be described in more detail in conjunction with FIGS. 4A–C and FIGS. 5 and 6.

Figure 4A:
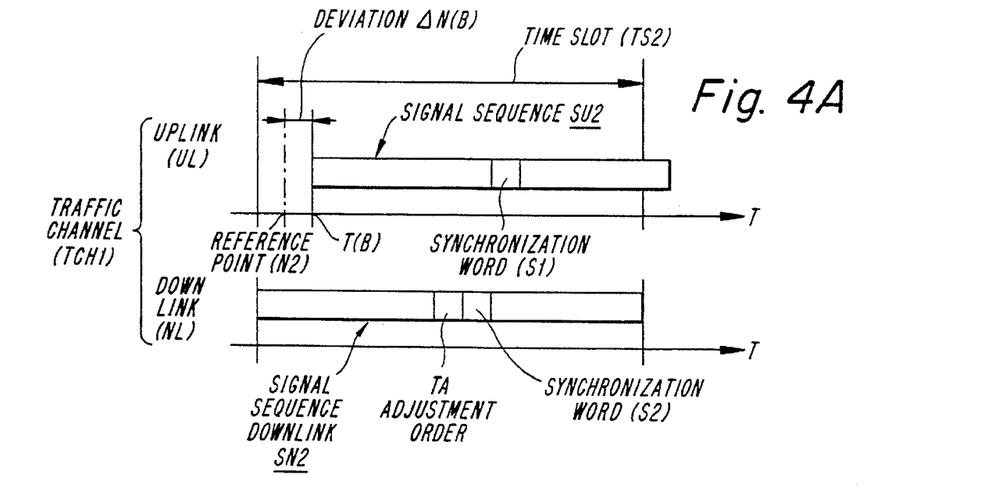
FIG. 4A shows a time diagram applicable to the base station, with symbol sequences which are transmitted during a call.
Figure 4B:
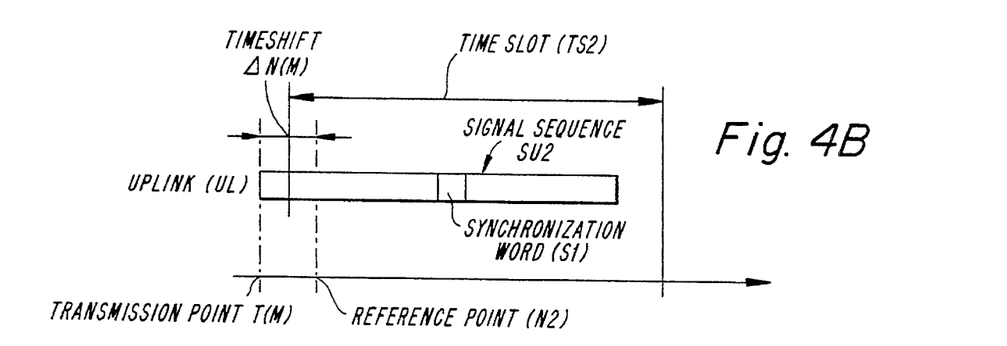
FIG. 4B shows a time diagram applicable to the mobile, with a symbol sequence which is transmitted during a call.
Figure 4C:
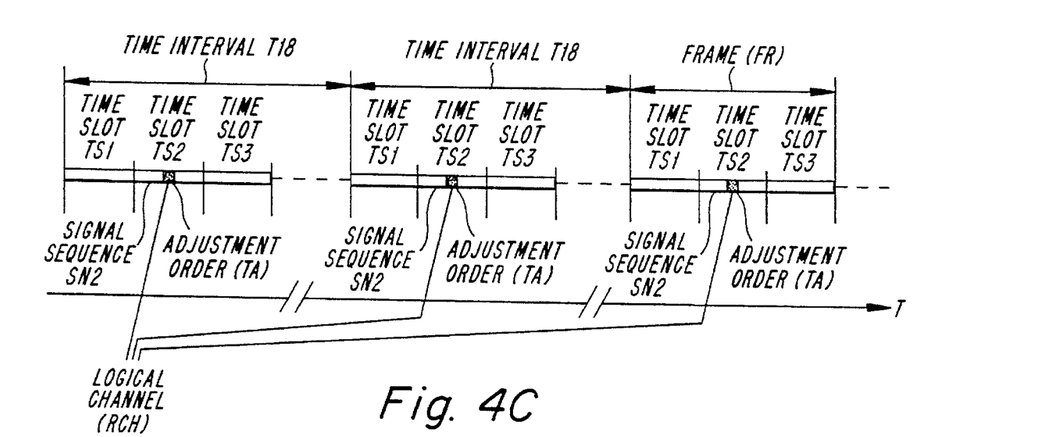
FIG. 4C shows a time diagram with a logical channel.

FIG. 4A shows more precisely one of the symbol sequences SN2 on the downlink NL and one of the symbol sequences SU2 on the uplink UL, when the sequence SU2 arrives at the base station BS1. The symbol sequence SU2 is received at a reception point in time T(B) at the base station BS1 and is delayed by a deviation ΔN(B), emanating as described above in conjunction with FIG. 1. The symbol sequence SU2 has a synchronization word S1, which is known to the base station BS1 and is used for measuring the time shift of the symbol sequence during the call between the subscriber A and the mobile MS2. On the downlink, the symbol sequence SN2 contains a symbol sequence TA, which is an adjustment order to the mobile MS2 to adjust its transmission point in time T(M) to a new position in relation to the reference point in time N2. The symbol sequence SN2 also contains a synchronization sequence S2, which is known to the mobile and with which the mobile checks the value of its reference point in time N2. The new transmission point in time T(M) for the mobile MS2 is shown in FIG. 4B, where the time shift is denoted by ΔN (M), as above. The new position means that the transmission point in time T (M) for the mobile MS2 is further advanced in relation to the transmission point in time shown in FIG. 2B. The symbol sequence SU2 from the mobile MS2 will, after the adjustment, arrive at the base station BS1 at the reference point in time N2, so that the condition that ΔN(B)=0 is fulfilled. The adjustment order TA is not sent for all symbol sequences SN2, but is transferred on a logical channel denoted by RCH, as shown in FIG. 4C. The downlink NL is shown in this Figure with the time slots TS1, TS2 and TS3 which recur repeatedly. The logical channel has a space in the time slot TS2 with a time interval T18, which comprises eighteen of the frames FR, each of which is 20 ms long, as above. The adjustment order TA thus recurs every eighteenth of the time slots TS2 which the base station BS1 transmits to the mobile MS2 and the adjustment order TA is repeated four times according to the present embodiment. According to one alternative, the adjustment order TA may be transmitted on the logical channel RCH having a wider time interval, e.g. for every thirty-six of the time slots TS2. It should be noted that the synchronization word SN2 on the downlink NL is present for every time slot TS2 and not just for the time slots that belong to the logical channel RCH. Consequently, the mobile MS2 will update its value of reference point in time N2 for every time slot TS2.

After having repeated the adjustment order TA four times, the base station BS1 continues measuring the time deviation ΔN(B) of the received symbol sequences SU2. If the erroneous time of reception T(B) is unchanged after the last repeat of the adjustment order TA, the base station BS1 orders a resynchronization of the mobile MS2. This is accomplished in the way described in conjunction with FIGS. 2A–C and FIG. 3. During resynchronization it may occur that the radio connection between the base station BS1 and the mobile MS1 is severely disturbed. In order to avoid errors during resynchronization, it is therefore an alternative not to use the adjustment order TA which is generated at the synchronization procedure according to FIG. 3. The previously generated adjustment order TA, repeated four times by the base station BS1, without being detected by the mobile MS2, is used instead. This older adjustment order is based on a generation of the mean of several symbol sequences and is more reliable than the new adjustment order generated by means of the limited number of symbol sequences SB1, SB2, SB3 and SB4 during the synchronization procedure.

The symbol sequences SN2 on the downlink NL on the traffic channel TCH1 have a synchronization word S2, as shown in FIG. 4A. This synchronization word is used by the mobile MS2 to update its reference point in time N2 during the course of the call. This update is performed through correlation, in the same way as for the synchronization word SWN, as described in conjunction with FIGS. 2C and 3.

Figure 5:
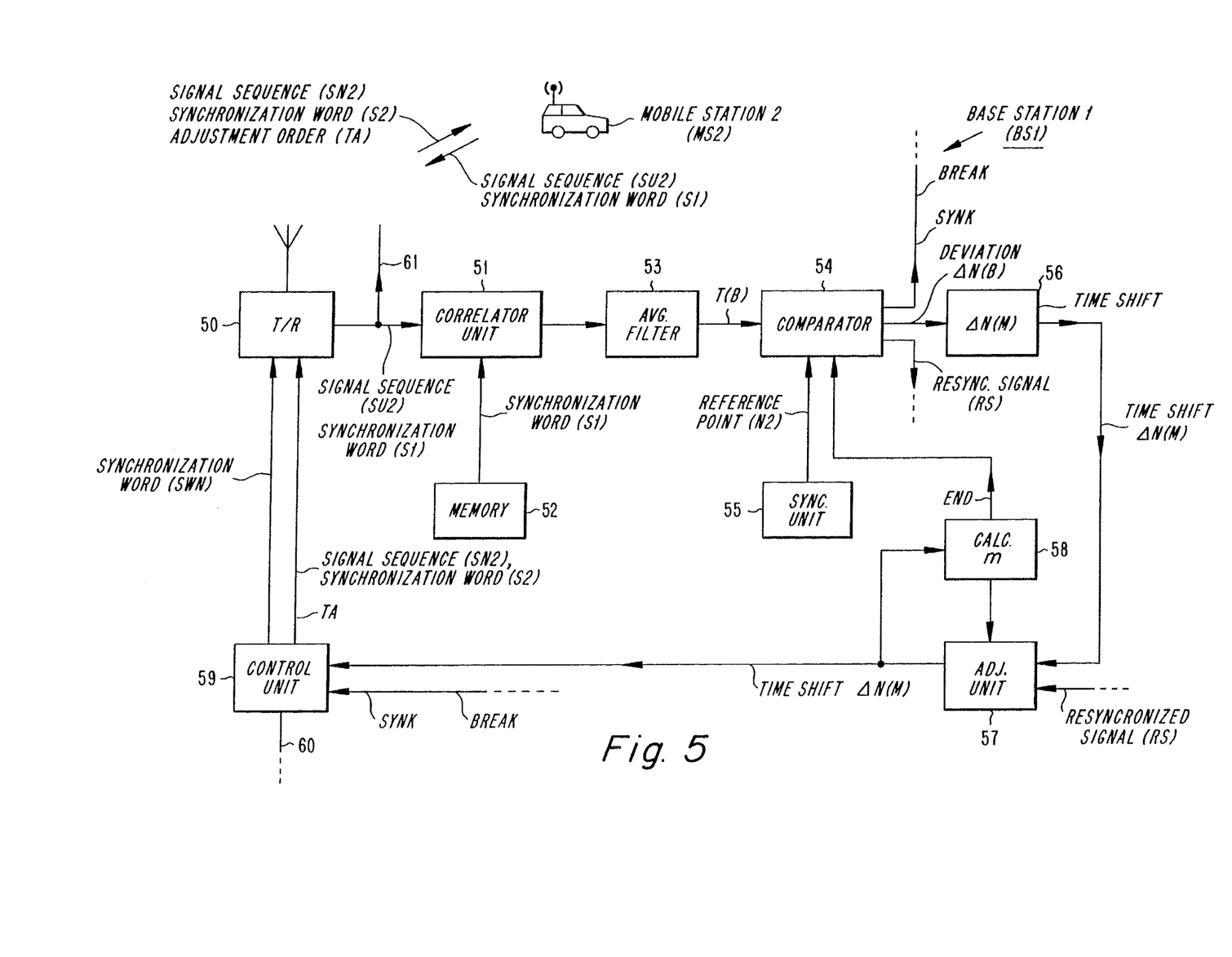
FIG. 5 shows a block diagram, containing parts of the base station.

FIG. 5 displays parts of a radio unit in the base station BS1, by means of which the initial synchronization is performed and with which the adjustment order TA is generated and transmitted to the mobile MS2 during the connection. A transmitter/receiver 50 is connected to a correlation unit 51, which is additionally connected to a memory unit 52. The output of the correlation unit is connected to an averaging filter 53. This filter has an output to a comparator 54, which also has an input which is connected to a synchronization unit 55. The comparator 54 has an output to a time control unit 56, which in turn has an output to an adjustment unit 57, with a calculating unit 58. The adjustment unit has an output to a control unit 59, which is connected to the transmitter/receiver 50. The control unit 59 has an input 60 from the exchange MSC, through which a spoken message can be transmitted from the telephone subscriber A, and the transmitter/receiver 50 has an output 61 to the exchange MSC for transmitting the mobile's MS2 messages to the subscriber A.

The transmitter/receiver 50 receives radio signals from the mobile MS2 and emits the symbol sequences SU2 including the synchronization word S1 to the correlator unit 51. The synchronization word S1 is earlier stored in the memory unit 52 and the correlator unit performs a correlation between the stored synchronization word and the received synchronization word S1 for each symbol sequence SU2 that is received. Through this, the successive points in time of reception are determined for the separate signal sequences SU2 that are received. The values obtained for the times of reception are averaged in the filter 53. This filter has a relatively large time constant, 5 seconds, according to the present embodiment. As mentioned before, the radio signal being received may be submitted to severe interference, and in order to avoid incessant adjustments to the mobile's MS2 transmission point in time, the averaging is performed during the relatively long period of 5 seconds. The obtained mean value is the reception point in time T(B) for the received symbol sequences SU2, which are shown in FIG. 4A. The point in time T(B) is stored and is compared with the reference point in time N2 in the comparator 54, which gets the reference point in time from the synchronization unit 55. The deviations obtained through the comparison, ΔN(B) according to FIG. 4A, are conveyed to the time control unit 56, when the deviations amount to one full symbol time. The time control unit adds the deviation ΔN(B) to the previous time shift ΔN(M) at the mobile and emits a new value ΔN(M) for the time shift at the mobile, as described in association with FIG. 4B. The new value of the time shift is emited to the adjustment unit 57, which by means of the calculating unit 58 emits the adjustment order TA repeatedly. On each occasion that the adjustment order TA is issued, the calculating unit 58 will increment its memory contents by one. The calculating unit begins with a value 0 and ends with an integer m, after which the repetition of the adjustment order is interrupted. According to the present embodiment, the adjustment order TA is repeated four times, i.e. m=4 and is forwarded to the control unit 59. This emits the adjustment order TA with every eighteen symbol sequence SN2 to the transmitter/receiver 50, which transmits the adjustment order TA with the symbol sequence SN2 on the downlink NL to the mobile MS2 on the logical channel RCH.

After the last repeat of the adjustment order TA, the generation of the value for the reception point in time T(B) continues. When the counter has reached its final value, i.e. m=4, it emits a signal END to the comparator 54, which then compares its stored value of the reception point in time T(B) with the recently generated values of the reception point in time. If the reception point in time has been changed, falling within a predetermined time interval, the mobile MS2 will have detected and performed the adjustment order TA. If, on the other hand, the reception point in time remains unchanged, the adjustment order has not been performed by the mobile MS2 and the comparator 54 issues a synchronization order SYNK. This synchronization order is conveyed to the control unit 59, by which the synchronization procedure is performed, according to FIG. 3. According to one alternative, the comparator issues a signal BREAK instead of the signal SYNK. With the signal BREAK, the control unit 59 discontinues the connection. This alternative is used only in case the traffic channel TCH1 disturbs the adjacent time slot considerably and is in itself severely disturbed by this adjacent time slot, so that the connections are not simultaneously usable for traffic.

As mentioned in the description in association with FIGS. 2, 3 and 4A–C, it may occur that the connection between the base station BS1 and the mobile MS2 will be exposed to harmful interference during the resynchronization after a failed time adjustment. The old adjustment order TA from the adjustment unit 57 is based on the averaging of several symbol sequences SU2, and is more reliable than the adjustment order that is generated during the resynchronization by means of the limited number of symbol sequences SB1, SB2, SB3 and SB4. According to one alternative, this fact is used in such a way that the adjustment order TA is stored in the memory of the adjustment unit even after the issuing of the last adjustment order to the control unit 59. The comparator 54 emits a signal RS together with the signal SYNK to the adjustment unit 57. This forwards its stored value for the adjustment order TA to the control unit 59, which uses this adjustment order at the resynchronization. According to yet an alternative, several of the latest adjustment orders TA are stored in the memory of the adjustment unit 57. Upon the signal RS from the comparator 54, these older adjustment orders are used in turn when resynchronizing. In this context, the last value of the adjustment order TA is tried first, in accordance with what has been described above. If the reception point in time T(B) for the base station then turns out to be erroneous, a new try is made with the last but one adjustment order and the procedure is repeated until either the resynchronization proves successful or the stored values for the adjustment order TA have been exhausted.

Figure 6:
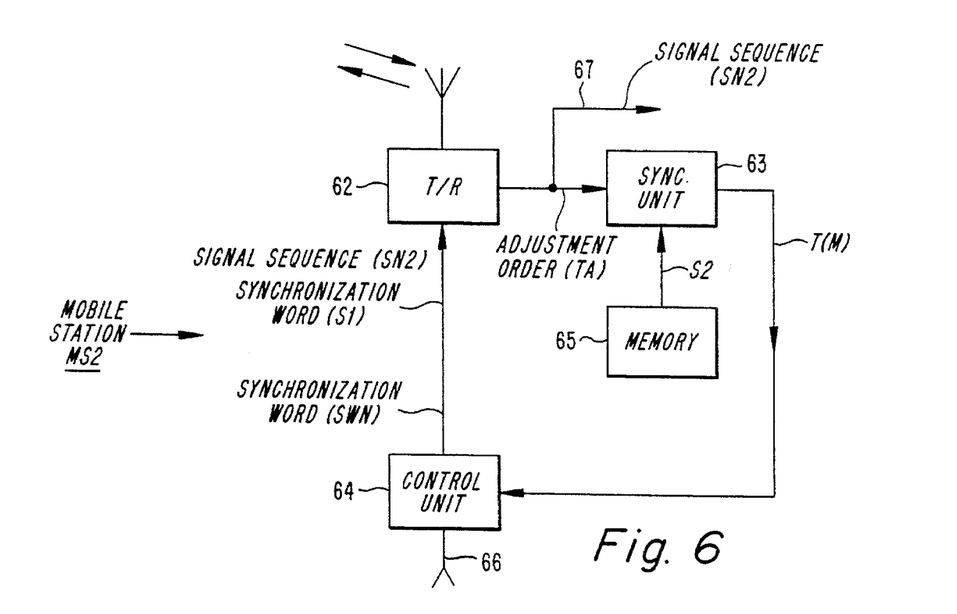
FIG. 6 shows a block diagram, containing parts of the mobile.

The mobile MS2 has, according to FIG. 6, a transmitter/receiver 62 which is connected to a synchronization unit 63, which in turn is connected to a control unit 64. The synchronization unit 63 is also connected to a memory unit 65 and the control unit has a microphone 66 and is connected to the transmitter/receiver 62, which has a signal output 67. The transmitter/receiver 62 receives a radio signal from the base station BS1 on the downlink NL with the symbol sequences SN2. The adjustment order TA and the synchronization word S2 that is transferred with the symbol sequences are submitted to the synchronization unit 63. This receives the stored synchronization word S2 from the memory unit 65 and performs a correlation with the received synchronization word S2 in order to generate the reference point in time N2. The synchronization unit 63 sets the reference point in time N2 and subsequently adjusts its transmission point in time T(M) in relation to its reference point in time N2 by means of the adjustment order TA, which contains the new value of the time shift ΔN(M). The synchronization unit 63 submits the transmission point in time T(M) to the control unit 64. This submits its symbol sequences SU2 with the synchronization word S1 to the transmitter/receiver 62, which emits the symbol sequences SU2 on the traffic channel TCH1 to the base station BS1 at the transmission point in time. The symbol sequences SU2 contain the information that shall be transmitted to the subscriber A, e.g. a spoken message from the microphone 66. From the subscriber A, information is conveyed with the symbol sequences SN2, communicated via radio, which symbol sequences are emitted via the signal output 67 and are transformed by arrangements not shown, into an audio signal, which can be understood by the subscriber in the mobile MS2. As mentioned, the adjustment order TA is repeated four times. If the mobile actually detects the first order, the repetitive orders will only imply that the synchronization unit 63 will be ordered to adjust to the transmission point in time already being held. The repetition of the adjustment order TA means that the plausibility that the mobile really adjusts to the new transmission point in time will increase substantially. If the probability for the mobile MS2 observing a single adjustment order is 0.6, the repetition implies that the risk of missing all four adjustment orders will be reduced to approximately $0.4^4=0.026$.

Figure 7:
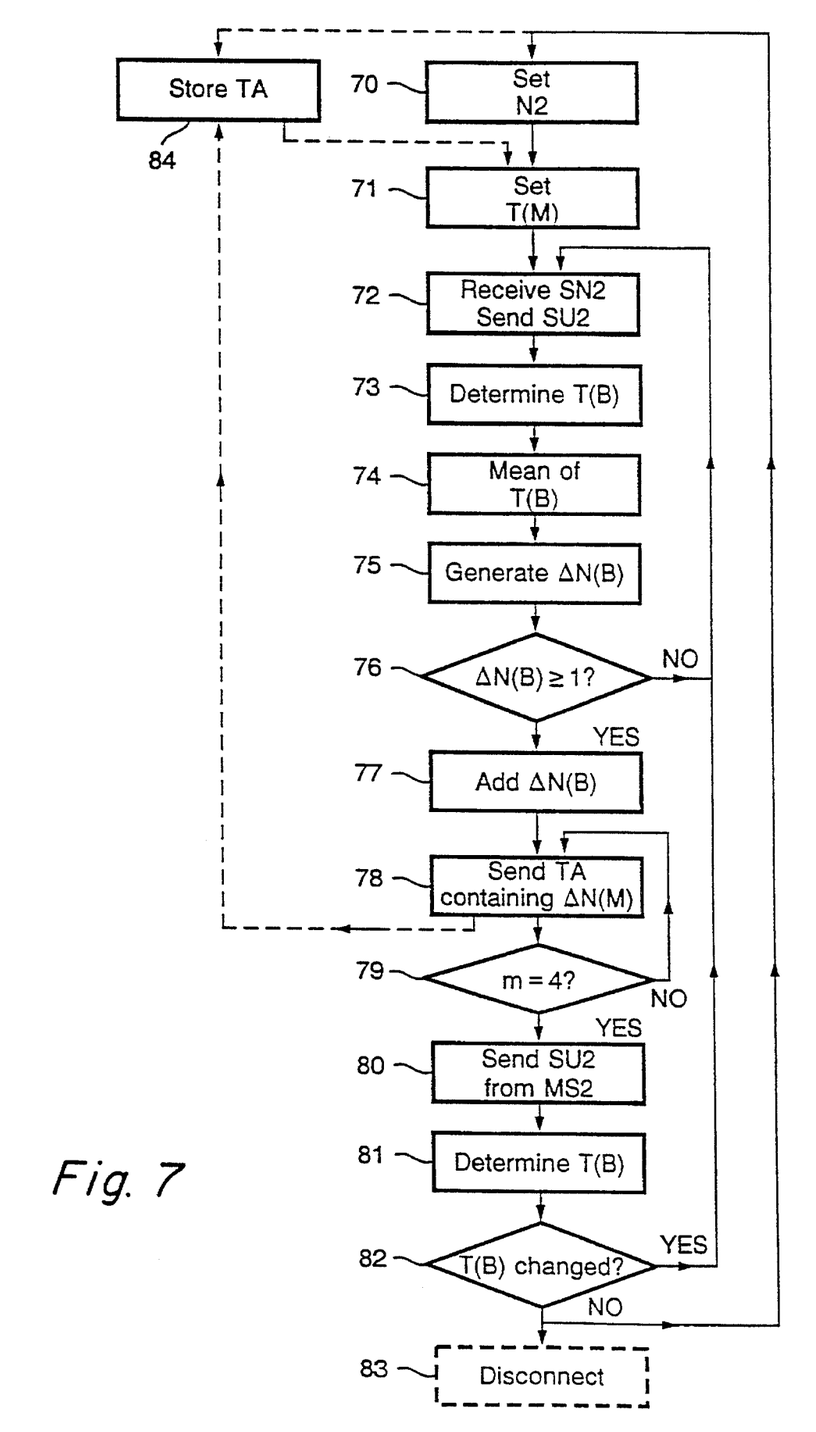
FIG. 7 shows a flow chart of the procedure according to the present invention.

FIG. 7 displays a flow chart with a summary of the procedure according to the present invention. According to block 70, the mobile will get its reference point in time N2 during the synchronization procedure, as described in association with FIGS. 3, 5 and 6. The transmission point in time T(M) of the mobile, is set by means of the adjustment order TA transferred at the synchronization, according to block 71. This transmission point in time T(M), which deviates from the reference point in time N2 by ΔN(M), is shown in FIG. 2B. According to block 72, the mobile receives the symbol sequences SN2 with the synchronization word S2 and sends its symbol sequences SU2 with the synchronization word S1 to the base station BS1. This base station measures the reception point in time T(B) by correlating the received synchronization word S1 with the internally stored synchronization word, according to block 73. In the base station BS1, the reception points in time T(B) are averaged according to block 74, and the time deviation ΔN(B) at the base station is generated by comparing the averaged reception point in time with the reference point in time N2, according to block 75. If the time deviation ΔN(B) falls below one symbol time, according to an alternative NO in block 76, no measures are taken at the base station BS1. The mobile MS2 will then continue by checking the reference point in time N2 only and by sending according to block 72. If the time deviation ΔN(B) amounts to one symbol time, this value is emitted according to one alternative YES in block 76. This time deviation is added to the mobile's MS2 previous time shift ΔN(M) in the base station BS1, according to block 77, so that a new value for the time shift ΔN(M) for the mobile is obtained. According to block 78, the base station BS1 sends the new time shift ΔN(M) with the adjustment order TA to the mobile MS2, as shown in FIG. 4A. According to block 79, the number of times m that the adjustment order has been issued is recorded. If the quantity m is less than 4, according to an alternative NO, the adjustment order TA is repeated, as described in association with FIG. 4C. If the quantity m equals 4, according to one alternative YES, the repetition of the adjustment order ceases. The mobile MS2 continues with sending its symbol sequences SU2 with the synchronization word S1, according to block 80. The base station BS1 determines, according to block 81, the new reception point in time T(B) after the last adjustment order TA. According to block 82, the new reception point in time is compared with the previous reception point in time. If a change has occurred, according to one alternative YES, that is the adjustment order has been performed, the mobile MS2 continues with checking its reference point in time N2 and sending according to block 72. If no change as to the reception point in time has occurred, according to one alternative NO in block 82, a resynchronization will be performed, according to block 70. As has been mentioned before, resynchronization is only one alternative, and according to another alternative, block 83, the connection is interrupted so that adjacent time slots on the same carrier frequency will not be disturbed. It should be noted that the alternative to interrupt a connection is only resorted to when the proprietary and an adjacent channel are so mutually disturbed that both connections are considered to be unusable.

As mentioned before, it may happen that the radio connection between the base station BS1 and the mobile MS2 is severely disturbed during resynchronization, following the alternative NO,in block 82. Then the adjustment order TA sent according to block 78, is often more reliable than the adjustment order TA that was generated during the resynchronization itself. According to one alternative, this fact is used so that the adjustment order TA in block 78 is stored according to block 84. At the resynchronization, according to the alternative NO in block 82, the stored value for the adjustment order TA is used for setting the transmission point in time T(M) for the mobile MS2. As described in association with FIG. 5, another alternative would be to store the values for several consecutive adjustment orders TA, according to block 84, to be used at the resynchronization. The latest adjustment order TA is used first, as described above. If, after this, the time deviation ΔN(B) is one symbol time or more, according to block 76, the alternative YES, the last but one of the stored adjustment orders TA is used. This way, repeated efforts using the stored adjustment orders will be performed until either the resynchronization is successful, that is ΔN(B)=0, or that all of the stored adjustment orders TA have been used.

Figure 8:
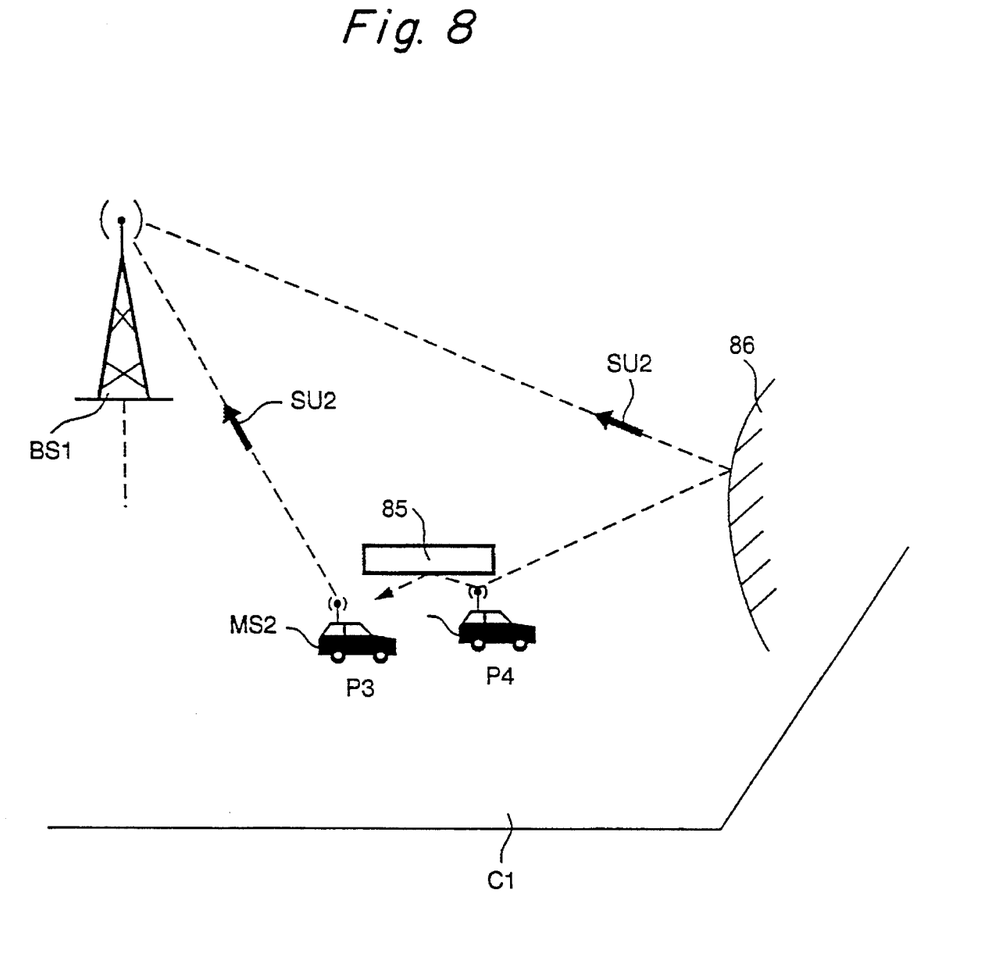
FIG. 8 shows the cell in FIG. 1, with separate signalling paths between the base station and the mobile station.

In conjunction with FIG. 1, it was described how the time shift for the reception point in time T(B) at the base station BS1 originated by the mobile MS2 moving away relatively far from the base station. The time shift may, however, appear even if the mobile MS2 moves a relatively short distance, as shown in FIG. 8. The mobile MS2 is located in a position P3 in the cell C1 and the signal sequences SU2 are transferred via the shortest path to the base station BS1. The mobile MS2 moves a relatively short distance to a position P4, which is in radio shadow behind a large building 85. The radio signals from the mobile MS2 are, however, reflected by a rock-face 86 and reaches the base station BS1. The signal sequences SU2 will thus have a considerably longer path to the base station BS1 and may be delayed for so long, that the transmission point in time T(M) for the mobile MS2 must be advanced through the adjustment order TA from the base station BS1. The invention may be applied even in cases where both radio stations can be regarded as being stationary. For satellite communication between a geostationary satellite and a fixed station on earth it may occur that the radio waves are deflected in the atmosphere and take different paths. When shifting between these different paths time shifts arise which are adjusted in the manner described above, using the adjustment order TA.

According to the present embodiment, the adjustment order TA has been repeated four times, i.e. the integer m=4 in FIG. 5. If a shortened time adjustment is desired, this value may be chosen to be one or two units less. If, on the other hand, it is desirable that the adjustment order TA should be detected by the mobile with a very high probability, the adjustment order is repeated yet one more time or even several more times. In the present embodiment, the invention has been described in conjunction with a mobile telephone system, but can be used in a more general mobile telecommunications system, for which both speech and data are transferred or for a completely generic radio communications system.

What is claimed is:

1. A procedure for a radio communications system with time-divided frequencies, which system comprises at least a first radio station and at least a second radio station transferring symbol sequences via connections between each other in time slots arranged into frames, wherein a transmission point in time for the symbol sequences from the second radio station is to be adjusted, which procedure comprises the following steps:

synchronizing the first and second radio stations, comprising allocating a traffic channel to a connection by means of a control channel, which traffic channel comprises a dedicated one of the time slots on a predetermined frequency, transmitting sychronization words during the sychronizing step and during on-going traffic, through which sychronization words the first radio station specifies a reference point in time for the second radio station, measuring, at the first radio station, a reception point in time in the dedicated time slot when the symbol sequences from the second radio station are received, determining, at the first radio station, a time deviation between the reception point in time and the reference point in time, generating a time shift for the second radio station based on the time deviation, generating an adjustment order for the second radio station to offset its transmission point in time by the size of the time shift, relative to the reference point in time, and transmitting the adjustment order from the first radio station, wherein, during on-going traffic, the adjustment order is sent in the dedicated time slot in at least two frames.

2. The procedure of claim 1, wherein the radio communications system is a mobile telecommunications system.

3. The procedure of claim 1, further comprising the steps of:

storing the reception point in time before the adjustment order is transmitted from the first radio station, remeasuring the reception point in time at the first radio station after having transferred the adjustment order repeatedly, comparing, at the first radio station, the stored reception point in time with the remeasured reception point in time, and ordering a new synchronization when the remeasured reception point in time remains unchanged relative to the stored reception point in time.

4. The procedure of claim 1, further comprising the steps of:

storing the reception point in time before the adjustment order is transmitted from the first radio station, remeasuring the reception point in time at the first radio station after having transferred the adjustment order repeatedly, comparing, at the first radio station, the stored reception point in time with the remeasured reception point in time, and ordering interruption of the connection when the remeasured reception point in time remains unchanged relative to the stored reception point in time.

5. The procedure of claim 1, further comprising the steps of:

storing at least a latest adjustment order, storing the reception point in time before the latest adjustment order is transmitted from the first radio station, remeasuring the reception point in time at the first radio station after having transferred the adjustment order repeatedly, comparing, at the first radio station, the stored reception point in time with the remeasured reception point in time, ordering a new synchronization when the remeasured reception point in time remains unchanged relative to the stored reception point in time, and utilizing at least the latest adjustment order at the new synchronization.

6. In a radio communications system with time-divided frequencies, which system comprises at least a first radio station and at least a second radio station transferring symbol sequences between each other in time slots arranged into frames, wherein a traffic channel interconnecting the first and the second radio stations comprises a dedicated one of the time slots on a predetermined frequency, a procedure for adjusting a transmission point in time for the symbol sequences from the second radio station comprising the following steps:

transmitting synchronization words during on-going traffic, through which synchronization words the first radio station specifies a reference point in time for the second radio station, measuring, at the first radio station, a reception point in time in the dedicated time slot when the symbol sequences from the second radio station are received, determining, at the first radio station, a time deviation between the reception point in time and the reference point in time, generating a time shift for the second radio station based on the time deviation, generating an adjustment order for the second radio station to offset its transmission point in time by the size of the time shift, relative to the reference point in time, and transmitting the adjustment order from the first radio station in the dedicated time slot in at least two frames.

7. The procedure of claim 6, wherein the radio communications system is a mobile telecommunications system.

8. In a radio communications system with time-divided frequencies, which system comprises at least a first radio station and at least a second radio station transferring symbol sequences via connections between each other in time slots arranged into frames, an arrangement for adjusting a transmission point in time for the symbol sequences from the second radio station comprising:

a control unit in the first radio station, which through a synchronization procedure allocates a traffic channel to a connection to the second radio station by means of a control channel, which traffic channel comprises a dedicated one of the time slots on a predetermined frequency, means for transferring synchronization words from the first radio station during the synchronization procedure and during on-going traffic, which synchronization words specify a reference point in time for the second radio station, correlation means, in the first radio station, for measuring a reception point in time in the dedicated time slot when the symbol sequences from the second radio station are received, comparison means, in the first radio station, for determining a time deviation between the reception point in time and the reference point in time, means, in the first radio station, for generating a time shift for the second radio station based on the time deviation, an adjustment unit for generating an adjustment order for the second radio station to offset its transmission point in time by the size of the time shift, relative to the reference point in time, and means for transmitting the adjustment order from the first radio station, wherein the transmitting means comprises repetition means for repeating the adjustment order in the dedicated time slot in at least two frames during ongoing traffic.

9. The arrangement of claim 8, wherein the radio communications system is a mobile telecommunications system.

10. The arrangement of claim 8, further comprising:

a comparator in which the reception point in time is stored, the stored reception point in time being valid before the adjustment order is sent from the first radio station, signal means for issuing a signal through which the comparator compares the stored reception point in time with a newly measured reception point in time generated after a last-transmitted adjustment order, and means for generating an order for a repetition of the synchronization procedure, which order is issued when the newly measured reception point in time is in accordance with the stored reception point in time.

11. The arrangement of claim 8, further comprising:

a comparator in which the reception point in time is stored, the stored reception point in time being valid before the adjustment order is sent from the first radio station, signal means for issuing a signal through which the comparator compares its stored reception point in time with a newly measured reception point in time generated after a last-transmitted adjustment order, and means for generating a release signal which releases the connection, when the newly measured reception point in time is in accordance with the stored reception point in time.

12. The arrangement of claim 8, further comprising:

a memory unit for storing at least a last-transmitted adjustment order, a comparator in which the reception point in time is stored, the stored reception point in time being valid before the adjustment order is sent from the first radio station, signal means for issuing a signal through which the comparator compares its stored reception point in time with a newly measured reception point in time generated after the last-transmitted adjustment order has been transmitted, means for generating an order for a repeated synchronization procedure, which order is issued when the newly-measured reception point in time is in accordance with the stored reception point in time, and means for issuing a signal through which at least the last-transmitted adjustment order is used at the repeated synchronization procedure.

13. In a radio communications system with time-divided frequencies, which system comprises at least a first radio station and at least a second radio station transferring symbol sequences between each other in time slots arranged into frames, wherein a traffic channel interconnecting the first and the second radio stations comprises a dedicated time slot on a predetermined frequency, an arrangement for adjusting a transmission point in time for the symbol sequences from the second radio station comprising:

means for transferring synchronization words from the first radio station during on-going traffic, through which synchronization words the first radio station specifies a reference point in time for the second radio station, correlation means, in the first radio station, for measuring a reception point in time in the dedicated time slot when the symbol sequences from the second radio station are received, comparison means, in the first radio station, for determining a time deviation between the reception point in time and the reference point in time, means, in the first radio station, for generating a time shift for the second radio station based on the time deviation, an adjustment unit for generating an adjustment order for the second radio station to offset its transmission point in time by the size of the time shift, relative to the reference point in time, means for repeating the adjustment order at least two times, and means for transmitting the adjustment order from the first radio station in the dedicated time slot in at least two frames.

14. The arrangement of claim 13, wherein the radio communications system is a mobile telecommunications system.

* * * * *